United States Patent [19]

Nemeth

[11] 3,768,300

[45] Oct. 30, 1973

[54] DIFFERENTIAL SORPTION CHROMATOGRAHY

[75] Inventor: Robert C. Nemeth, Huntington Station, N.Y.

[73] Assignee: Vacuum Instrument Corporation, Huntington Station, N.Y.

[22] Filed: Sept. 24, 1971

[21] Appl. No.: 183,348

[52] U.S. Cl. .............................. 73/23.1, 23/254 E
[51] Int. Cl. .......................................... G01n 25/18
[58] Field of Search ............................ 73/23, 23.1; 23/232 C, 254 E, 255 E; 55/67, 74, 75, 197, 386, 389

[56] References Cited
UNITED STATES PATENTS

| | | | |
|---|---|---|---|
| 3,522,172 | 7/1970 | Pretorius et al. | 55/67 X |
| 3,043,128 | 7/1962 | Ayers | 73/23.1 |
| 3,043,127 | 7/1962 | DeFord et al. | 73/23.1 |
| 3,057,183 | 10/1962 | DeFord | 73/23.1 |
| 3,310,932 | 3/1967 | Melpolder | 55/386 |
| 3,311,455 | 3/1967 | Robinson | 23/255 E |

Primary Examiner—Jerry W. Myracle
Attorney—Rose & Edell

[57] ABSTRACT

Chromatographic analysis of fluids is effected with a compact structure having a housing segmented into sequential compartments by interconnected heater elements coated on one surface by molecular sieve material. The compartments are differentially heated and sample fluid is caused to flow sequentially through compartments of decreasing temperature. Molecular components of the fluid are adsorbed by molecular sieve material in the first compartment in the flow path having a lower temperature than the adsorption temperature of those components. After a sample is adsorbed the entire housing is allowed to cool and is then heated to a temperature above the highest desorption temperature of sample fluid components. The adsorbed components thus desorb and are exhausted from the housing while being monitored by a temperature sensing resistor. The time each group of molecules passes the resistor is related to the compartment from which it was desorbed, which in turn is an indication of the adsorption temperature of those molecules.

13 Claims, 4 Drawing Figures

PATENTED OCT 30 1973　　　　　　　　　　3,768,300
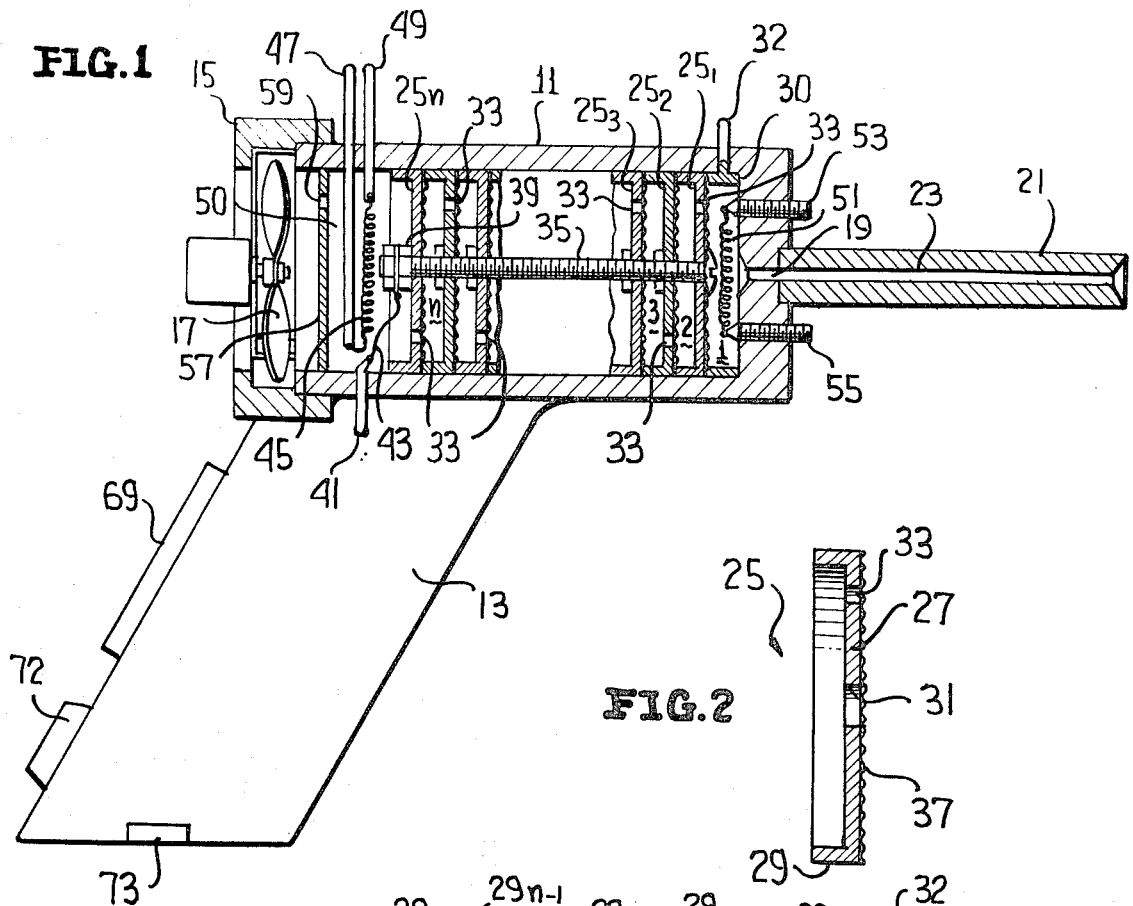
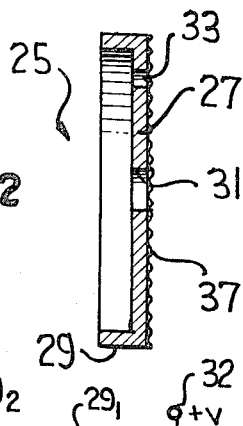
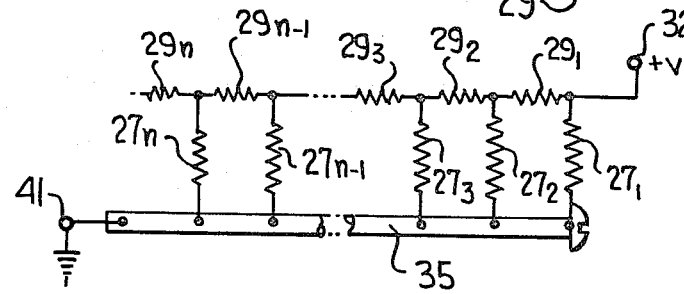
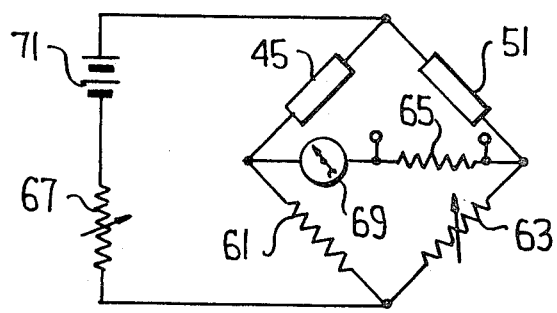
INVENTOR
ROBERT C. NEMETH
By Rose & Edell
ATTORNEYS

DIFFERENTIAL SORPTION CHROMATOGRAHY

BACKGROUND OF THE INVENTION

The present invention relates to method and apparatus for separating and analyzing constituent components of a fluid and, more particularly, to an improvement in thermal chromotography employing differential sorption techniques.

The recent and long overdue concern over the air-polluting effects of automobile emissions has led to legislation which purports to limit the quantity of certain constituents of those emissions. The legislation prevents automobile manufacturers from selling any vehicle having emission constituents in concentrations above predetermined standard levels. Analysis of emissions in the factory can be readily achieved with present day fluid analysis methods. However, as a practical matter, it is difficult, if not impossible, to require the millions of automobile owners to maintain their vehicles in proper operating condition so that emission content does not deteriorate beyond the concentration standards. The main problem in this regard is the lack of inexpensive and easily performed methods for analyzing emissions. The relatively complex and costly techniques employed by manufacturers are simply not practical for neighborhood service stations. In this regard, I believe my novel method and apparatus for chromatographic analysis, as described herein, to be ideally suited for use in service stations to measure automobile emission content. With my approach, legislation requiring the automobile owner to maintain his vehicle in proper condition to meet the emission standards becomes practical.

Apart from measuring motor vehicle emission content, the present invention also has utility in monitoring constituents of other fluids, particularly in those applications where a compact and inexpensive apparatus is required to perform the monitoring function.

Chromatographic analysis of fluids may be effected by passing fluid through a column packed with sorbant material which adsorbs various constituent components of the fluid at respective locations in the column. The thusly separated components are then desorbed from the sorbant material and caused to flow out of the column where they are monitored in sequence. In thermal chromatography desorption is effected by moving a temperature gradient along the column exterior so that adsorbed components at various column locations may be selectively desorbed.

One prior art approach to thermal chromatography involves translation of a furnace at a predetermined rate along the column to maintain the desired temperature gradient within the portion of the column which is subjected to heating by the furnace. This method is cumbersome, time consuming, expensive, and clearly not suited to use by service stations in monitoring automobile exhaust. Alternative approaches to thermal chromatography have been developed. One such approach is described in U.S. Pat No. 3,062,039 to Ayers and involves circulation of fluid at controllable temperatures through a conduit surrounding the chromatographic column. When the circulated fluid is heated, the requisite temperature gradient for desorption is effected within the column. This approach is less cumbersome than that of the movable furnace but suffers from lack of accuracy and relative slowness in the performance of an analysis sequence. In addition, supplying and heating a fluid for this purpose is costly and impractical in a service station.

Another prior art approach to thermal chromatography is disclosed in U.S. Pat. No. 3,146,616 to Loyd and involves wrapping a tapped resistance coil about the chromatographic column and supplying current to the various taps in succession. Loyd's approach provides an accuracy improvement but is still somewhat cumbersome and expensive in that it requires a motor or the like to effect successive energization of the various taps.

It is therefore an object of the present invention to provide an improved approach to thermal chromatography, and particularly, an approach which is practical for use in service stations to monitor motor vehicle emissions.

It is another object of the present invention to provide a simple apparatus for chromatographic analysis of fluids wherein no moving parts are required to effect selective desorption of the constituent components of the fluid.

It is another object of the present invention to provide a compact and portable apparatus for analyzing fluids.

It is still another object of the present invention to provide an inexpensive and easily performed method for analyzing fluids.

SUMMARY OF THE INVENTION

In accordance with the principles of the present invention, a fluid to be analyzed is passed through a housing divided into a series of compartments by a plurality of spaced heater elements which are coated with molecular sieve material. Successive heater elements are arranged to conduct progressively smaller currents, whereby each compartment is heated to a different temperature and an overall decreasing temperature gradient is provided in a downstream direction in the housing. Constituent components of the fluid are adsorbed on the molecular sieves in the different compartments as determined by (1) molecular size of the constituent component relative to cross-section of the sieve pores in that compartment; and (2) sorption temperature of the constituent component. If the same molecular sieve material is employed to coat each heater element, the constituent components are separated solely on the basis of their sorption temperatures. If different sieve materials are employed in different compartments, constituent separation is effected on the bases of both sorption temperature and molecular size.

After the fluid sample has been adsorbed, the system is allowed to cool. At this point, desorption is effected by passing current through the heating elements at a level sufficient to heat all compartments above the desorption temperatures of all the constituent components of the sample fluid. The desorbed molecules are caused to flow to the downstream end of the housing and are detected there as a function of time. Those components which had been adsorbed at the upstream end of the housing reach the downstream end at a discernably later time than those which had been adsorbed proximate the downstream end.

The unit is battery powered or line powered and housed in a relatively small package, preferably in the form of a hand gun.

BRIEF DESCRIPTION OF DRAWINGS

The above and still further objects, features and advantages of the present invention will become apparent upon consideration of the following detailed description of one specific embodiment thereof, especially when taken in conjunction with the accompanying drawings, wherein:

FIG. 1 is a plan view in partial section of chromatographic analyzer of the present invention;

FIG. 2 is a plan view in section of a typical heater element employed in the analyzer of FIG. 1;

FIG. 3 is an electrical schematic diagram illustrating the differential heating approach employed in the analyzer of FIG. 1; and FIG. 4 is an electrical schematic diagram of a wheatstone bridge detector employed in the analyzer of FIG. 1.

DESCRIPTION OF PREFERRED EMBODIMENT

Referring to FIG. 1, there is illustrated an embodiment of the invention taking the configuration of a hand gun comprising a main housing portion 11 of electrically insulative material and a handle 13 depending from the rearward end of the housing. Housing 11 has an elongated hollow interior of generally cylindrical configuration open at its rearward end and closed at its front end. Mounted at the rearward end of housing 11 is a fan housing or pump housing 15 containing an exhaust fan and/or pump 17 arranged to exhause fluid from housing 11 in the direction from front to rear. A small aperture 19 is defined through the front wall of housing 11 along the central longitudinal axis of the hollow cylinder. Aperture 19 is funnel-shaped with the funnel stem extending outwardly to the front of the housing.

A generally cylindrical probe 21 having an internal capillary passage 23 is secured to and projects forwardly of the front end of housing 11 with capillary passage 23 aligned with aperture 19. Probe 21, for example, may be of such configuration to be readily inserted in the tail pipe of a motor vehicle, whereby exhaust action created by fan or pump 17 causes vehicle emissions to flow through housing 11.

The interior of housing 11 is divided into plural compartments 1, 2, 3 – n, extending from front to rear of the housing by a respective plurality of heater elements $25_1, 25_2, 25_3 - 25_n$. The heater elements may comprise, for example, nichrome discs which act as resistance heaters in response to passage of electric current therethrough. Heater elements 25, as best illustrated in FIG. 2, include a plate 27 of flat, circular configuration, dimensioned to fit snuggly in the interior circular cross-section of housing 11. A raised rim portion 29 of plate 27 extends towards the rear of housing 11. The rim 29 of each heater element (for example, element $25_1$) abuts the front of plate 27 of the next sequential heater element $25_2$ to provide electrical contact between successive heater elements. The spacing between plates 27 of successive elements 25, as determined by the depth of rim 29, defines the various compartments 2, 3 – n. Compartment 1 is defined between heater $25_1$ and the front wall of housing 11, the two being separated by an annular electrode 30 of the same outside diameter as heater element 25 and having a terminal 32 extending therefrom exteriorly of housing 11.

Each heater element 25 includes a support aperture 31 defined centrally through its circular plate 27 and a radially offset flow aperture 33, also defined through plate 27. An electrically conductive electrode stem 35 extends through aperture 31 of each heater element, the apertures being of such size to make good electrical contact circumferentially with the stem. Flow apertures 33, as the name implies, permit sample fluid to flow between the otherwise sealed compartments 1, 2, 3 – n. These apertures, as illustrated in FIG. 1, are intentionally misaligned in successive heating elements, preferably by 180°. Misalignment of apertures 33 prevents sample fluid from flowing entirely through housing 11 without contacting molecular sieve material as described below.

The forward face of each circular plate 27 is coated with a molecular sieve material 37 (or adsorbant film) except in the region of apertures 31, 33. The pores of the molecular sieve coating may either be the same or different at each heater element, depending upon the type of analysis to be performed (as described subsequently). Important, however, is the fact that the material acts to adsorb fluid molecules of predetermined size (as determined by the pore size of the sieve material) at temperatures below the sorption temperature of the molecules, and to desorb said molecules at temperatures above the molecule sorption temperature. Since constituent components of a fluid have different sorption temperatures and/or molecular sizes, molecular sieve material serves as a convenient tool for separating constituent components of a fluid.

A region 50 located at the rearward or downstream end of housing 11, defined between heater element $25_n$ and exhaust fan housing 15, contains an annular electrode 39 secured on the downstream end of electrode stem 35. A terminal 41 also extends into this region from exteriorly of housing 11 and is connected by current lead 43 to electrode 39. In the same downstream region there is disposed a thermally responsive resistor 45 (such as a thermistor or bolometer), secured between a pair of terminals 47, 49 extending into housing 11 from exteriorly thereof. A similar resistor 51 is disposed in compartment 1, supported between two similar terminals 53, 55 across aperture 19.

A circular disc 57, having a flow aperture 59 defined therethrough, is disposed downstream of resistor 45 and upstream of exhaust fan 17. The purpose of disc 57 is to prevent fluid molecules, which have passed through all of the compartments, from being exhausted from housing 11 before their presence can be detected by resistor 43 in the manner to be described.

The configuration of heating elements 25 in FIG. 1 may be viewed as a string of series resistors, represented by rims 29, each shunted to ground by a respective shunt resistor, represented by plates 27 connected to anode stem 35, assuming of course that terminal 41 is grounded. This configuration is illustrated schematically in FIG. 3 wherein each of the series rim resistors is designated by the reference numeral 29 and an appropriate subscript, and each of the shunt plate resistors is designated by the numeral 27 and an appropriate subscript. If a voltage, +V, is applied to terminal 32 and terminal 41 is grounded, current flows through all of the heating elements 25. Each of the elements 25 dissipates heat as a function of the current flowing therethrough. Assume for present purposes that the resistances of resistors $27_1, 27_2, 27_3, - 27_n$ are equal, and that the resistances of resistors $29_1, 29_2, 29_3 - 29_n$ are equal, an assumption which merely supposes that each of heating elements 25 are identical in construction. The voltage across resistor $27_1$ is +V; however, the voltages across resistors $27_2, 27_3 - 27_n$ are successively less than +V because of the voltage drops appearing across resistors $29_1, 29_2, 29_3 - 29_{n-1}$ respectively. Consequently, the current through resistor $27_1$, and the heat dissipated thereby, is greater than the current through and heat dissipated by resistor $27_2$. This causes the temperature of the molecule sieve material in compartment 1 to be higher than that of compartment 2. By similar analysis it is seen that the molecular sieve coatings in compartments 2 through $n$ are at successively lower temperatures. Under such circumstances, molecules having higher sorption temperatures tend to be adsorbed by molecular sieve material in compartments at the forward end of housing 11. Molecules having lower sorption temperatures tend to be adsorbed by molecular sieve material toward the rearward end of the housing.

Referring to FIG. 4, there is illustrated a wheatstone bridge circuit including voltage source 71 and level adjustment resistor 67 connected in series across the bridge which comprises a first branch including temperature sensitive resistor 45 in series with a fixed resistor 61, and a second branch including temperature sensitive resistor 51 in series with adjustable resistor 63. A series circuit comprising voltage dropping resistor 65 and meter 69 is connected between the junction of resistors 45, 61 and the junction between resistors 51, 63. All of the components of FIG. 4 except temperature sensitive resistors 45, 51 are preferably located in handle 13, with meter 69 being mounted on the rear of the handle for easy viewing. The purpose of the bridge circuit is to monitor the passage of molecules through all of the compartments to the rearward end of housing 11. This is accomplished in a conventional manner by employing resistor 45 to sense the temperature increases associated with molecules passing thereby, the temperature increases causing a bridge unbalance as monitored by meter 69. Alternatively, a recording device may be connected across resistor 65 and employed to monitor the temperature changes experienced by resistor 45. The presence of resistor 51 inside housing 11 assures that ambient temperature variations in the housing do not affect bridge balance, since both resistors 45 and 51 are equally affected by ambient temperature.

Also located in handle 13 is a selectively energizable voltage source which can be either selectively or permanently connected to electrodes 41 and 32 to differentially heat the various housing compartments 1 through $n$. This voltage source (not shown) has included therewith a variable resistor 72 or the like mounted on handle 13 to permit variation of the output voltage from the source. Actuation of this source may be effected by an on-off switch 73 mounted on handle 13.

In operation, voltage is applied across the electrodes 32 and 41 at the level required to obtain the desired range of temperatures in the different compartments. This range of temperatures is selected to encompass the adsorption temperatures of all components to be examined in the sample fluid. Probe 21 is then positioned in the sample fluid (i.e., — in the tail pipe of a motor vehicle) and exhaust fan 17 is energized. This causes sample fluid to flow through capillary passage 23 into housing 11. Assume all heating elements 25 to be coated with molecular sieve material of the same pore size; which size is such to be able to adsorb molecules of all of the sample fluid components being examined. Those components whose adsorption temperatures are highest are adsorbed by the molecular sieve material in compartment 1. Those components whose adsorption temperatures are lowest are exhausted through apertures 33 in the forward heating elements and adsorbed by the molecular sieve material in rearward compartments such as compartment $n$. Molecules of other components are adsorbed at intermediate compartments having temperatures at or slightly below the adsorption temperatures of those molecules.

After a fluid sample has been differentially adsorbed, voltage across terminals 41 and 32 is reduced to zero and housing 11 is permitted to cool.

From this point in time, the method proceeds by suddenly heating the housing, as by applying a relatively high voltage across terminals 32 and 41, such that all compartments are at temperatures above the highest desorption temperature of the adsorbed molecules. Specifically, upon heating of the housing, all adsorbed molecules desorb simultaneously and are exhausted from the housing by fan 17. Molecules which had been adsorbed in chamber n reach temperature sensitive resistor 45 before all others and produce a temperature change thereat which is a function of the number of molecules which had been adsorbed at chamber $n$. Likewise, molecules adsorbed at chamber 1 reach resistor 45 after molecules adsorbed at all other chambers. A recorder (tape, brush, etc.) connected across resistor 65 (FIG. 4) registers a pulse as each group of desorbed molecules reaches resistor 45, the pulse amplitude being a function of the number of molecules in that group.

The record produced by the recorder gives the following information. Each pulse represents molecules having a particular adsorption temperature, which temperature may be determined from the position of the pulse on the time scale of the record. From this, and a knowledge of the adsorption temperatures of the sample fluid components under examination, it is relatively simple to determine which components are present. The amplitude of each pulse, as mentioned above, also provides a measure of the number of molecules of each component present in the sample fluid. Consequently, the record provides both a qualitative and quantitative measure of the sample fluid.

Even without a recorder, meter 69 will register "kicks" or "pulses" with each group of molecules reaching resistor 45. The operator need only look for pulses above pre-specified amplitudes to see if any constituent is present in quantities above those permitted by specification. If any pulse exceeds the pre-specified amplitude, the recorder can be connected and the process repeated to effect a more detailed analysis.

Various modifications within the scope of the invention may be made to the embodiment described above. For example, the method for differentially adsorbing the constituent components of the sample fluid may proceed as described above, and the housing cooled, also as described above. At that point housing 11 may be heated in incremental steps to temperatures corresponding to respective desorption temperatures of the sample fluid. This may be done by applying heater voltage across heater $25_n$ and stem 35 rather than across heater 25₁ and stem 35 as in the adsorption process. To this end, an additional electrode would have to be added for heater 25ₙ and a simple switch arrangement would be required to switch the heater supply from one set of electrodes to the other. At each incremental heater current, molecules would be desorbed in a respective compartment, starting with compartment n for the lowest incremental heater current and terminating with compartment 1 for the highest current. Thus, after each incremental heater voltage step, one group of molecules will be desorbed and will register at meter 69 as they are exhausted from the housing by the fan. The desorption temperature corresponding to each incremental voltage is known in advance and therefore provides a qualitative indication of the component being desorbed. The degree of deflection at meter 69 is a quantitative measure of the desorbed components.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A differential sorption analyzer of sample fluid, comprising:
   a housing having upstream and downstream ends,
   a plurality of elements disposed sequentially in said housing to define a sequence of fluid-isolated compartments longitudinally of said housing between said upstream and downstream ends, each element having a fluid passage defined therethrough to provide fluid communication between successive compartments, the fluid passages through successive elements being misaligned;
   a plurality of molecular absorbant coatings, each on a like surface of a respective one of said elements;
   inlet means for admitting sample fluid into the upstream end of said housing;
   means for flowing fluid in said housing in a downstream direction;
   actuable means for at will differentially heating said compartments to provide the highest temperature at the most upstream compartment and successively lower temperatures at successive downstream compartments; and
   monitor means for registering the flow of molecules at the downstream end of said housing.

2. The analyzer according to claim 1 wherein said actuable means simultaneously heats all of said compartments.

3. The analyzer according to claim 2 wherein said actuable means includes means for at will heating all of said compartments to temperatures above the desorption temperature of the component of said sample fluid having the highest desorption temperature.

4. The analyzer according to claim 3 wherein said elements each comprise an electrical heating element having an established resistivity, each heating element being resistively connected to its immediately preceding and immediately succeeding heating element, said analyzer including a first electrode connected in common to all of said heating elements and a second electrode connected to the extreme upstream heating element, and wherein said actuable means comprises a source of heater voltage selectively actuable across said first and second electrodes.

5. The analyzer according to claim 3:
   wherein said housing includes interior walls of electrically insulative material;
   wherein said elements comprise disks of electrically resistive heating material, each having a peripheral configuration which conforms to the cross-sectional configuration of the interior of said housing, each disk having a raised rim extending into electrical contact with an adjacent sequential disk; and further comprising:
      an electrically conductive rod extending longitudinally of said housing through and in electrical contact with each of said disks;
      a first electrode electrically connected to said rod; and
      a second electrode electrically connected to the rim of the extreme upstream disk; and
   wherein said actuable means comprises a source of heater voltage selectively applicable across said first and second electrodes.

6. The analyzer according to claim 5 wherein said coatings comprise molecular sieve material.

7. The analyzer according to claim 5 wherein said plurality of disks have the same configuration and resistivities and wherein said rod contacts each disk substantially at the geometric center of the disk.

8. The analyzer according to claim 7 wherein said housing is in the form of a barrel of a hand-gun having a handle portion, said analyzer further including a capillary passage projecting forwardly of said housing in fluid communication with said inlet means.

9. The analyzer according to claim 8 wherein said monitor means includes a temperature sensitive variable resistor mounted inside said housing proximate said downstream end.

10. The analyzer according to claim 9 wherein said monitor means includes a bridge circuit including said temperature sensitive variable resistor and a second temperature sensitive variable resistor, said second resistor being mounted inside said housing proximate said inlet means.

11. The analyzer according to claim 8 further comprising a meter connected to said bridge circuit for measuring bridge unbalance, said meter being mounted in the handle portion of said hand gun.

12. A differential sorption analyzer of sample fluid, comprising:
   a housing having upstream and downstream ends,
   a plurality of compartments disposed sequentially in said housing between said upstream and downstream ends, successive compartments being connected by a fluid passage, successive fluid passages being misaligned;
   molecular adsorbant material in each compartment;
   inlet means for admitting fluid into the upstream end of said housing;
   means for flowing fluid in said housing in a downstream direction;
   actuable means for differentially heating all of said compartments simultaneously to provide the highest temperature at the most upstream compartment and successively lower temperatures at successive downstream compartments; and
   monitor means for measuring flow of molecules at the downstream end of said housing.

13. The analyzer according to claim 12 wherein said molecular adsorbant material comprises a coating on a like surface of each of said elements.

* * * * *